United States Patent
Pillekamp et al.

(10) Patent No.: US 6,219,563 B1
(45) Date of Patent: *Apr. 17, 2001

(54) METHOD FOR SIGNAL TRANSMISSION IN A COMMUNICATION SYSTEM BETWEEN A MOBILE RADIO TRANSMISSION/RECEPTION DEVICE AND A STATIONARY RADIO TRANSMISSION/RECEPTION DEVICE

(75) Inventors: Klaus-Dieter Pillekamp, Erkrath; Christoph Euscher, Rhede; Dietmar Gapski, Duisburg, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,902

(22) PCT Filed: Jan. 10, 1996

(86) PCT No.: PCT/DE96/00020

§ 371 Date: Jul. 17, 1997

§ 102(e) Date: Jul. 17, 1997

(87) PCT Pub. No.: WO96/22646

PCT Pub. Date: Jul. 25, 1996

(30) Foreign Application Priority Data

Jan. 20, 1995 (DE) .............................................. 195 01 688

(51) Int. Cl.$^7$ ...................................................... H04B 1/38
(52) U.S. Cl. ............................ 455/562; 455/25; 455/462; 343/757
(58) Field of Search ................................. 455/561, 562, 455/517, 25, 465, 277.1, 277.2, 462; 343/751, 757–761; 342/423, 379, 429

(56) References Cited

U.S. PATENT DOCUMENTS

| 5,021,801 | | 6/1991 | Smith et al. . | |
| 5,303,240 | * | 4/1994 | Borras et al. | 370/347 |
| 5,535,423 | * | 7/1996 | Dupuy | 455/33.1 |
| 5,617,102 | * | 4/1997 | Prater | 342/374 |
| 5,740,526 | * | 4/1998 | Bonta et al. | 455/277.2 |
| 5,752,164 | * | 5/1998 | Jones | 455/33.1 |
| 5,835,859 | * | 10/1998 | Doner | 455/447 |

FOREIGN PATENT DOCUMENTS

| 61-237531 | 10/1986 | (JP) . |
| 1-300634 | 5/1989 | (JP) . |
| 1-202036 | 8/1989 | (JP) . |
| 4-238424 | 8/1992 | (JP) . |
| 6-069723 | 3/1994 | (JP) . |

OTHER PUBLICATIONS

Patent Abstracts of Japan: vol. 13, No. 503 (E–844), Nov. 13, 1989, & JP 01 202036, Aug. 15, 1989, Tsurumi Hiroshi et al, Radio Communication System, English translation attached.

Patent Abstracts of Japan: vol. 11, No. 83, (E–489), Mar. 13, 1987, & JP 61 237531, Oct. 22, 1986, Ono Motoi, Mobile Radio System, English translation attached.

PIMRC 1994/WCN, IEEE/ICCC, XP 000571909, P.E. Mogensen et al, Antenna Configuration Measurements for Dect Micro–Cells, pp. 1075–1080.

* cited by examiner

*Primary Examiner*—Edward F. Urban
*Assistant Examiner*—Congvan Tran
(74) *Attorney, Agent, or Firm*—Bell, Boyd & Lloyd LLC

(57) ABSTRACT

The radio area to be covered by the stationary radio transmission/reception device, for example of the base station of a cordless telephone, is illuminated by two or more directional antennas (3, 4) respectively covering a radio sub-area thereof, whereby that respective directional antenna in whose radio sub-area the mobile radio transmission/reception means, i.e., for example, the mobile part of the cordless telephone, is located is activated (antenna diversity). The method and apparatus can be advantageously utilized in cordless telephones.

12 Claims, 2 Drawing Sheets

METHOD FOR SIGNAL TRANSMISSION IN A COMMUNICATION SYSTEM BETWEEN A MOBILE RADIO TRANSMISSION/RECEPTION DEVICE AND A STATIONARY RADIO TRANSMISSION/RECEPTION DEVICE

BACKGROUND OF THE INVENTION

The invention is directed to a method for signal transmission in a communication system between a mobile radio and a base station. The invention is also directed to an apparatus for the implementation of this method.

The range in a wireless communication system, for example a cordless telephone, that is composed of a stationary and of a mobile radio transmission/reception means is defined essentially by its transmission power and its receiver sensitivity. The transmission power is thereby usually uniformly emitted in all directions, i.e. nearly spherically, in order, first, to be universally employable in every environment and, second, to achieve the same range in every direction. When, however, an individual is point in time is considered, then—from the point of view of the stationary radio transmission/reception means, i.e. of the base station of the cordless telephone in the example—only a fraction of the transmission energy is emitted in the direction of the mobile radio transmission/reception means, i.e. the mobile part of the cordless telephone in the example. The great majority of the transmission energy, by contrast, is not utilized and can even have an interfering effect on external devices.

A stationary radio transmission/reception means with a sharply bundling direction al antenna would be desirable that emits the available energy concentrated in precisely that direction in which the mobile radio transmission/reception means is situated at the moment. However, a not insubstantial outlay for locating the mobile means, i.e. the mobile part of a cordless telephone in the example, and for the exact alignment of the directional antenna would be required therefor.

SUMMARY OF THE INVENTION

An object of the invention is to create a considerably less involved possibility of improving the transmission behavior between the mobile and the stationary radio transmission/reception means of a telecommunication system, particularly of a cordless telephone.

In general terms the present invention is a method for signal transmission in a communication system between a mobile radio transmission/reception means provided with an antenna means, particularly the mobile part of a cordless telephone, and a stationary radio transmission/reception means likewise provided with an antenna means, particularly the base station of a cordless telephone. The radio area to be covered by the stationary radio transmission/reception means is illuminated by two or more directional antennas, each respectively covering a radio sub-area thereof. The directional antennas form the antenna means of the stationary radio transmission/reception means. In the fashion of antenna diversity, the directional antenna is activated in whose radio sub-area the mobile radio transmission/reception means is located.

The sum of the radio sub-areas covered by all directional antennas of the stationary radio transmission/reception means forms an at least approximately point-symmetrical radio area.

A manually implemented alignability of the directional antennas, so that the radio area they illuminate can be matched to the respectively existing environment, for example a building.

The selection of the directional antenna to be respectively activated is undertaken on the basis of comparative measurements of the reception field strength in the stationary radio transmission/reception means.

In general terms the present invention is also an apparatus for the implementation of the above-described method. The antenna means of the stationary radio transmission/reception means is equipped with two or more directional antennas, whereof each covers a radio sub-area of the radio area to be acquired by the stationary radio transmission/reception means. The directional antenna in whose radio sub-area the mobile radio transmission/reception means is located is respectively activated.

Advantageous developments of this embodiment of the present invention are as follows.

A direction adjustment means is provided for the directional antennas of the stationary radio transmission/reception means.

A measuring means with which the reception field strengths of the signals incident via the individual directional antennas and coming from a mobile radio transmission/reception means are measured is provided in the radio transmission/reception means. A comparison and selection means is provided that compares the reception field strengths and determines the highest thereof, so that the directional antenna at which the highest reception field strength is present is activated.

The directional antennas of the stationary radio transmission/reception means are formed by what are referred to as quick-heading beam antennas that are respectively composed of a vertical half-wave radiator with four parasitic elements that are arranged at the distance of $0.15\lambda$ ($\lambda$=wavelength) each from the half-wave radiator and whose lengths are switched such that they optionally act either as directors or as reflectors.

This form of antenna diversity, however, is to be distinguished from that utilized to combat fading effects and that is disclosed by German Utility Model 92 14 455. When the antenna diversity method fashioned according to the invention is implemented with directional antennas at the side of the stationary radio transmission/reception means of the system, then the employment of an anti-fading antenna diversity arrangement is not possible at the side of the stationary transmission/reception means, i.e., for example, at the side of the base station of a cordless telephone, unless each directional antenna were doubly implemented. The function of the known anti-fading antenna diversity, however, can be displaced into the mobile radio transmission/reception means of the system, i.e. into the mobile part of a cordless telephone in the example, or, respectively, this function can be limited to the mobile part.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS.

Figure 1:
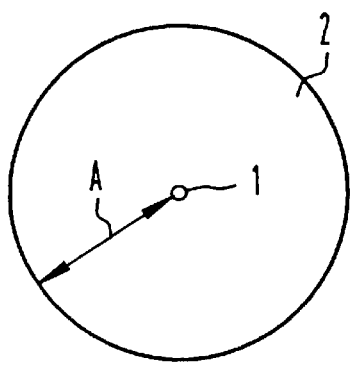
FIGS. 1–9 depict various radiation distributions in planar sections associated with the present invention.

FIG. 1 shows the known case wherein the transmission power of a stationary transmission/reception means, for example the base station of a cordless telephone, is uniformly output in the environment thereof with an omnidirectional antenna 1 or, respectively, radio signals deriving from a mobile radio transmission/reception means, for example, thus, from the mobile part of the cordless telephone, are uniformly omnidirectionally received by this stationary radio transmission/reception means. The antenna 1 thus has what is referred to as an omnidirectional characteristic 2 with which an identical range A is achieved in every direction. When viewing only a single point in time, the stationary radio transmission/reception means only emits a fraction of the transmission energy in the direction of the mobile radio transmission/reception means, by contrast whereto the great majority of the transmission energy is not exploited.

Figure 2:
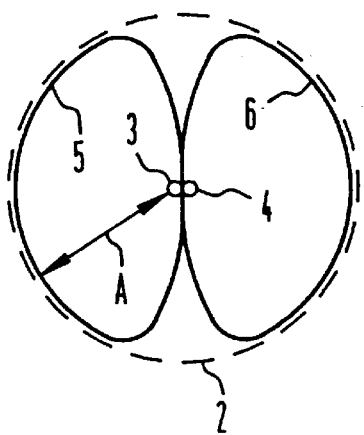

FIG. 2, compared thereto, shows the division of the region shown with broken lines and having the range A into two sub-areas. Each of these two individual sub-areas is illuminated by the stationary radio transmission/reception means with a respective antenna 3 or, respectively, 4 having directional characteristic 5 or, respectively, 6. In the fashion of antenna diversity, that of the two directional antennas 3 and 4 in which the mobile radio transmission/reception means is located is thereby respectively active. Since the range A remains the same in the case illustrated in FIG. 2, the transmission power and the receiver sensitivity of the stationary means can be reduced.

Figure 3:
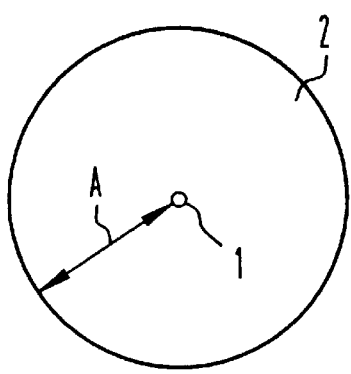
Figure 4:
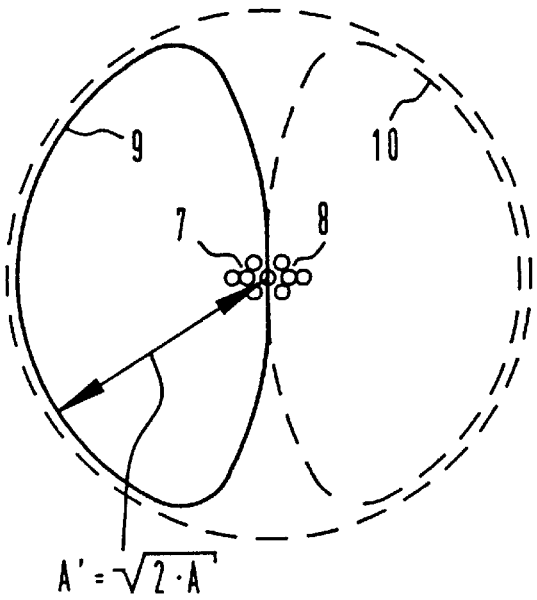

A comparison of FIG. 3, in which, agreeing with FIG. 1, the omnidirectional characteristics 2 of an antenna 1 of a stationary radio transmission/reception means, i.e., for example, of the base station of a cordless telephone, having the range A is shown to FIG. 4, in which the same energy is emitted respectively upon activation via respectively one of the two directional antennas 7 and 8 (transmission case) or, respectively, the same receiver sensitivity (reception case) exists as in the case according to FIG. 3, shows that the range A' then achieved is increased by the factor √2 compared to the range A of FIG. 3 given free space propagation. FIGS. 3 and 4 thus shown the gain in range to be expected given an antenna diversity implemented according to the invention and unmodified transmission power / receiver sensitivity. In the example of FIG. 4, the antenna characteristic 9 (shown with solid lines) of the directional antenna 7 is activated at the illustrated point in time, by contrast whereto the antenna characteristic 10 (shown with broken lines) of the directional antenna is not active at the moment since the mobile radio transmission/reception means is located in the radio sub-area with the range A' covered by the directional antenna 7.

It can thus be stated that a concentration of the transmission power onto a hemisphere corresponds to the doubling of the power emitted into this hemisphere. A doubling of the transmission power thus corresponds to an increase of the range by the factor √2.

Figure 5:
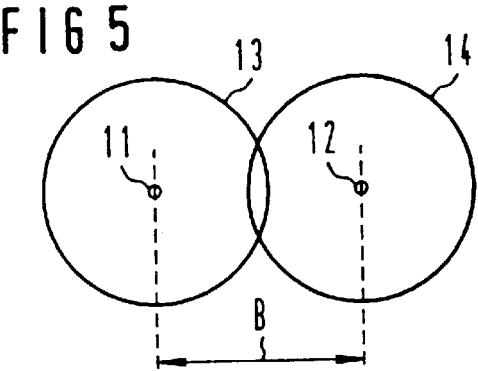

FIG. 10 is a block diagram depicting the embodiment of the present invention. Significant advantages of the method according to the invention are explained on the basis of FIGS. 5 through 9 for a cordless telephone composed of a base station 11 and a mobile part 12. In the standard case, which is shown in FIG. 5, the base station 11 and the mobile part 12 respectively comprise an antenna with omnidirectional characteristics 13 or, respectively, 14. The distance B between the base station 11 and the mobile part 12 is dimensioned such in this example that radio communication can still just be implemented given the ranges that are provided.

Figure 6:
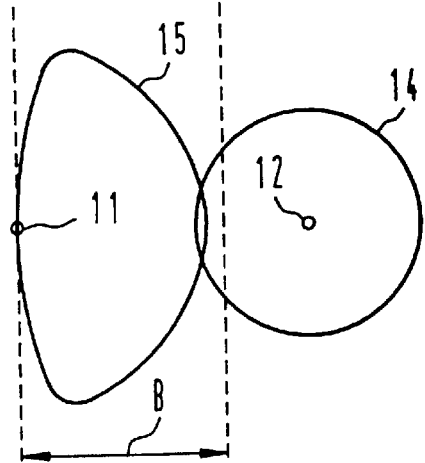
Figure 7:
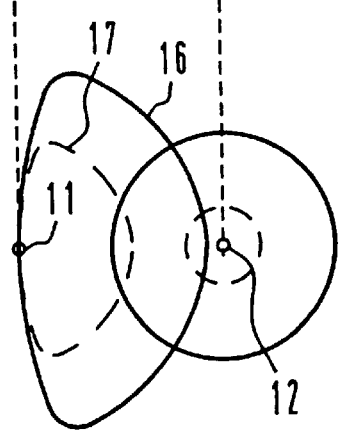

FIG. 6 shows the case of how, given unmodified transmission power or, respectively, receiver sensitivity compared to FIG. 5, the range of the communication system, i.e. of the cordless telephone in the illustrated case, is increased according to the invention by the factor √2 given free space propagation by employing an antenna having a directional characteristic 15 in the base station 11. The mobile part 12 is still reached by the base station 11 when their spacing is considerably greater than the distance B in the case of FIG. 5, which is the actual condition before the invention. When the method of the invention is not utilized for increasing the range, as in FIG. 6, the demands made of the receiver sensitivity of the base station 11 and of the mobile part 12 can be reduced, possibilities for cost reduction usually deriving therefrom. This case is shown in FIG. 7, wherein the area in which the transmission signal does not fall below a standard level is respectively shown with a solid line and the area in which a signal can be received with at least standard level is shown with broken lines. Here, thus, the base station 11 transmits with a radiation power increased by the gain of the directional characteristic 16, so that the sensitivity (shown with broken lines) of the receiver of the mobile part 12 can be reduced. Due to the employment of a directional antenna in the base station 11, conversely, the receiver sensitivity thereof can likewise be reduced given transmission of signals on the part of the mobile part 12, since the reduced directional characteristic 17 (shown with broken lines) still suffices for faultlessly receiving signals transmitted from the mobile part 10.

Figure 8:
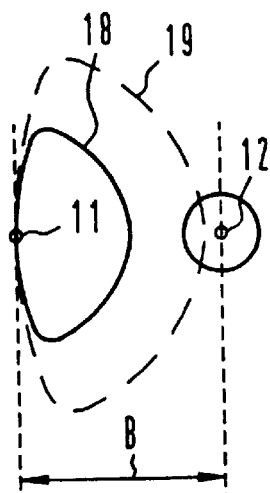

When the method according to the invention is not utilized for increasing the range, then—alternatively to the reduction of the receiver sensitivity that was explained on the basis of FIG. 7—the transmission power in the base station 11 and in the mobile part 12 can be reduced. This case is shown in FIG. 8. Due to the lower energy consumption, this leads to an increase in the operating duration of the battery-powered mobile part 12. In FIG. 8, the area in which the transmission signal does not fall below a standard level is shown with a solid line, and the area in which a signal can be received with at least standard level is shown with a broken line. In the case of transmissions on the part of the base station 11, a lower transmission power suffices for reaching the mobile part 12 in terms of radio due to the employment of a directional characteristic 18. When, by contrast, the base station is to receive, a diminished transmission power of the mobile part 12 suffices since the base station 11 exhibits enhanced reception sensitivity with the directional characteristic 19 shown with broken lines.

Generally valid is that a reduction of the perturbing radiation derives due to the employment of the method according to the invention. No power, namely, is beamed out into the sub-area in which the mobile part 12 is not located, i.e. external devices within this sub-area are not disturbed. When the method of the invention is not employed for increasing the range, then—as was already stated above—the transmission power of the mobile part 12 can be reduced. The interfering effect on other systems in the environment of the mobile part 12 is thereby reduced.

Figure 9:
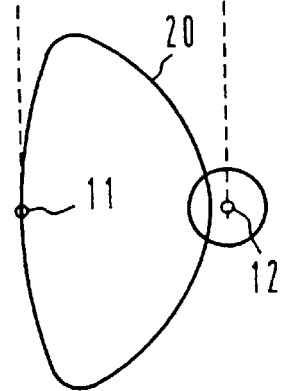

With reference to FIG. 9, it shall also be explained below that there is also the possibility of uniting the various advantages of the inventive method in the mobile part 12.

The transmission power and the receiver sensitivity of the base station 11 remain unmodified up to the antenna pick-up point. Due to the directional characteristic 20 of the directional antenna, which yields a gain in a radio sub-area, however, both the radiation power as well as the receiver sensitivity are effectively enhanced in this radio sub-area.

The "greater" effective transmission power of the base station 11 enables the reduction of the receiver sensitivity of the mobile part 12. Since it is provided that a base station 11 maintains contact to a plurality of mobile parts, the cost-saving in the receiver of the mobile part 12 takes multiple effect.

The "greater" effective sensitivity of the base station 11 also enables the reduction of the transmission power of the mobile part 12. As a result, first, the power consumption of the mobile part 12 is reduced, i.e. a longer operating duration derives or, however, one can manage with a smaller and, therefore, more beneficial battery. On the other hand, the interfering effect on other system in the proximity of the mobile part 12 is reduced.

The directional antenna or antennas of the stationary radio transmission/reception means can be expediently differently set with a direction adjustment means.

What are referred to as quick-heading beam antennas can be advantageously employed as adjustable directional antennas; these are to be viewed as a development of the vertical half-wave beam antenna and are respectively composed of a vertical half-wave radiator with four parasitic elements that are arranged at the distance of 0.15 $\lambda.(\lambda=$wavelength) each from the half-wave radiator and whose lengths are switched such that they optionally act either as directors or as reflectors. What is achieved in this way is that the beam antenna sweeps all directions with its principal radiation due to appropriate switching without having to rotate the antenna. In terms of its effect, the quick-heading beam antenna roughly corresponds to a 3-element Yagi antenna.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for signal transmission in a communication system between a mobile radio transmission/reception device having a mobile antenna device, and a stationary radio transmission/reception device having a stationary antenna device, the method comprising the steps of:

illuminating a radio area to be covered by the stationary radio transmission/reception device by at least two individual directional antennas, the at least two individual directional antennas forming the stationary antenna device;

providing radio sub-areas of the radio area;

covering each respective radio sub-area of the radio area with a respective one of the at least two individual directional antennas; and activating in antenna diversity fashion a respective one of the at least two individual directional antennas in whose respective radio sub-area the mobile radio transmission/reception device is located, wherein only one of the at least two individual directional antennas is activated at any one point in time for both transmitting and receiving data to and from the mobile antenna device.

2. The method according to claim 1, wherein a sum of the radio sub-areas covered by all of the directional antennas of the stationary radio transmission/reception device forms an at least approximately point-symmetrical radio area.

3. The method according to claim 1, wherein the method further comprises the step of manually aligning the directional antennas, so that the radio area illuminated is matched to an existing environment.

4. The method according to claim 1, wherein the method further comprises the step of selecting one of the directional antennas to be respectively activated based on comparative measurements of reception field strength in the stationary radio transmission/reception device.

5. A method for signal transmission in a communication system between a mobile radio transmission/reception device having a mobile antenna device, and a stationary radio transmission/reception device having a stationary antenna device, the method comprising the steps of:

illuminating a radio area to be covered by the stationary radio transmission/reception device by at least two individual directional antennas, the at least two individual directional antennas forming the stationary antenna device;

providing radio sub-areas of the radio area;

covering each respective radio sub-area of the radio area with a respective one of the at least two individual directional antennas;

activating in antenna diversity fashion a respective one of the at least two individual directional antennas in whose respective radio sub-areas the mobile radio transmission/reception device is located, wherein only one of the at least two individual directional antennas is activated at any one point in time for both transmitting and receiving data to and from the mobile antenna device; and wherein the mobile radio transmission/reception device is a mobile telephone, and the stationary radio transmission/reception device is a base station.

6. The method according to claim 5, wherein a sum of the radio sub-areas covered by all of the directional antennas of the stationary radio transmission/reception device forms an at least approximately point-symmetrical radio area.

7. The method according to claim 5, wherein the method further comprises the step of manually aligning the directional antennas, so that the radio area illuminated is matched to an existing environment.

8. The method according to claim 5, wherein the method further comprises the step of selecting one of the directional antennas to be respectively activated based on comparative measurements of reception field strength in the stationary radio transmission/reception device.

9. An apparatus for signal transmission in a communication system between a mobile radio transmission/reception device and a stationary radio transmission/reception device, the apparatus comprising:

a mobile antenna device on the mobile radio transmission/reception device; and a stationary antenna device on the stationary radio transmission/reception device, the stationary antenna device formed of at least two individual directional antennas which together illuminate a radio area to be covered by the stationary radio transmission/reception device, each of the at least two individual directional antennas respectively covering a radio sub-area of the radio area to be covered by the stationary radio transmission/reception device, wherein a respective one of the at least two individual directional antennas in whose respective radio sub-area the mobile radio transmission/reception device is located is respectively activated in antenna diversity fashion, wherein only one of the at least two individual directional antennas is activated at any one point in time for both transmitting and receiving data to and from the mobile antenna device.

10. The apparatus according to claim 9, wherein the apparatus further comprises:

a direction adjustment device for the directional antennas of the stationary radio transmission/reception device.

11. The apparatus according to claim 7, wherein the apparatus further comprises: a measuring device with which respective reception field strengths of signals incident via each of the directional antennas and coming from a respective mobile radio transmission/reception device are measured in the stationary radio transmission/reception devices wherein a comparison and selection device compares the reception field strengths and determines a highest thereof, so that the respective one directional antenna at which the highest reception field strength is present is activated.

12. The apparatus according to claim 9, wherein the directional antennas of the stationary radio transmission/reception device are quick-heading beam antennas that are respectively composed of a vertical half-wave radiator with four parasitic elements that are arranged at a distance of $0.15 \lambda$, where $\lambda$ is a wavelength each from the half-wave radiator and whose lengths are switched such that the elements optionally act either as directors or as reflectors.

\* \* \* \* \*